US008600075B2

(12) United States Patent
Lim (10) Patent No.: US 8,600,075 B2
(45) Date of Patent: Dec. 3, 2013

(54) METHOD FOR EQUALIZING AUDIO, AND VIDEO APPARATUS USING THE SAME

(75) Inventor: Soo-chan Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1357 days.

(21) Appl. No.: 12/041,124

(22) Filed: Mar. 3, 2008

(65) Prior Publication Data

US 2009/0067664 A1    Mar. 12, 2009

(30) Foreign Application Priority Data

Sep. 11, 2007 (KR) .................. 10-2007-0092309

(51) Int. Cl.
*H03G 5/00* (2006.01)
(52) U.S. Cl.
USPC ........................................ 381/103; 381/56
(58) Field of Classification Search
USPC ......... 381/102, 104–109, 56, 57, 1, 300, 311, 381/98, 77, 17, 67, 103; 700/94; 348/14.08, 348/739, 158; 345/204; 353/15; 84/724; 333/28 R
See application file for complete search history.

(56) References Cited

U.S. PATENT DOCUMENTS

| | | | |
|---|---|---|---|
| 6,359,994 B1* | 3/2002 | Markow et al. | ............... 381/333 |
| 6,479,742 B1* | 11/2002 | Torii et al. | ................ 84/724 |
| 6,801,628 B1* | 10/2004 | Thiel | ................ 381/56 |
| 7,690,792 B2 | 4/2010 | Matsuzawa | |
| 2001/0024505 A1 | 9/2001 | Torii et al. | |
| 2004/0169722 A1* | 9/2004 | Pena | .................. 348/14.01 |
| 2006/0210090 A1* | 9/2006 | Shennib | ................ 381/67 |
| 2008/0055548 A1* | 3/2008 | Matsuzawa | ............ 353/15 |
| 2009/0147980 A1* | 6/2009 | Fincham | ................ 381/352 |

FOREIGN PATENT DOCUMENTS

| | | | | |
|---|---|---|---|---|
| EP | 0117487 | * | 9/1984 | ............... H04R 5/02 |
| EP | 0117487 A | | 9/1984 | |
| JP | 06-105390 A | | 4/1994 | |
| JP | 10-069279 A | | 3/1998 | |
| JP | 2007-074255 | * | 3/2007 | ............... H04R 3/02 |
| JP | 2007-243398 | * | 9/2007 | ............... H04N 5/60 |
| JP | 2007243398 A | | 9/2007 | |
| KR | 1020070040785 A | | 4/2007 | |
| WO | 2006/006294 A | | 1/2006 | |

OTHER PUBLICATIONS

Communication, dated Sep. 27, 2013, issued by the Korean Patent Office in counterpart Korean Application No. 10-2007-0092309.

* cited by examiner

*Primary Examiner* — Lao Lun-See
(74) *Attorney, Agent, or Firm* — Sughrue Mion, PLLC (57) ABSTRACT

A method for equalizing audio and a video apparatus using the audio equalizing method are provided. The method for equalizing audio includes detecting the distance between a speaker mounted in a video apparatus and a reflective surface, and equalizing an audio signal to be output from the speaker based on the detected distance. Accordingly, attenuation of audio output is reduced, so audio output is optimized.

24 Claims, 8 Drawing Sheets

| DISTANCE | FREQUENCY | dB | Q VALUE |
|---|---|---|---|
| 10cm | 3K | 5 | 0.2 |
| | 4K | 10 | 0.3 |
| | 6K | 4 | 0.1 |
| 40cm | 3.5K | 5 | 0.1 |
| | 5.6K | 10 | 0.3 |

METHOD FOR EQUALIZING AUDIO, AND VIDEO APPARATUS USING THE SAME

CROSS-REFERENCE TO RELATED APPLICATIONS

This application claims priority under 35 U.S.C. §119 from Korean Patent Application No. 10-2007-0092309, filed on Sep. 11, 2007, in the Korean Intellectual Property Office, the disclosure of which is incorporated herein by reference in its entirety.

BACKGROUND OF THE INVENTION

1. Field of the Invention

Apparatuses and methods consistent with the present invention relate to providing a method for equalizing audio and a video apparatus using the same, and more particularly, to providing a method for equalizing and thereby optimizing audio by removing attenuation of the audio when a speaker faces downwards, and a video apparatus using the same.

2. Description of the Related Art

Figure 1:
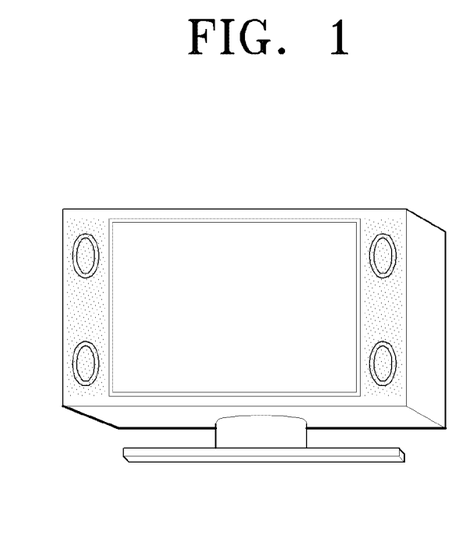
FIG. 1 illustrates a related art television having speakers on the front.

FIG. 1 illustrates a general television (TV) having speakers on both sides. The front of the TV is large in order to provide space for the speakers, and this is aesthetically not good.

Therefore, there is demand for TVs without speakers in the front, and thus there is a need for methods for preventing audio attenuation from being generated in this case.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

The present invention provides an audio equalizing method to provide a more aesthetical design by moving the position of speakers from the front of a TV to the bottom and to prevent audio attenuation from being generated by speakers not facing viewers, and a video apparatus using the same.

According to an exemplary aspect of the present invention, there is provided a method for equalizing audio, the method including: detecting the distance between a speaker mounted in a video apparatus and a reflective surface; and equalizing an audio signal to be output from the speaker based on the detected distance.

In the equalization operation, an adjusting value corresponding to the detected distance from among adjusting values necessary to generate an optimal audio signal according to the distance may be read out, and the audio signal may be equalized using the read-out adjusting value.

The adjusting values may be a list of values comprising a frequency value and a decibel level.

The reflective surface may be a floor or a table.

In the detection operation, the distance between the speaker and the reflective surface may be detected using an ultrasonic wave sensor.

In the detection operation, the distance between the speaker and the reflective surface may be detected based on information input by a user.

The detection operation may include: receiving information on whether the video apparatus is in a stand-alone type or a wall-mounted type; detecting pre-stored distance information if the video device is the stand-alone type; and receiving information on the distance between the speaker and the reflective surface from the user if the video device is the wall-mounted type.

The video apparatus may be a display apparatus comprising the speaker.

The display apparatus may be a television, the speaker may be mounted on the bottom of the television, and a tympanum of the speaker may face downwards.

The method may further include determining the material of the reflective surface, wherein in the equalization operation, the audio signal to be output from the speaker is equalized based on the material of the reflective surface and the distance between the speaker and the reflective surface.

According to another exemplary aspect of the present invention, there is provided a video apparatus including: a speaker which outputs an audio signal; an equalizer unit which equalizes the audio signal according to a control signal; and a control unit which detects the distance between the speaker and a reflective surface, and operates the equalizer unit to equalize the audio signal based on the detected distance.

The video apparatus may further include a memory unit which stores adjusting values necessary to generate an optimal audio signal according to the detected distance, wherein the control unit reads out an adjusting value corresponding to the detected distance from the memory unit, and equalizes the audio signal using the read-out adjusting value.

The adjusting values may be a list of values comprising a frequency value and a decibel level.

The reflective surface may be a floor or a table.

The video apparatus may further include an ultrasonic wave sensor unit which detects the distance between the speaker and the reflective surface, wherein the control unit detects the distance using the ultrasonic wave sensor unit.

The video apparatus may further include an input unit which receives information on the distance between the speaker and the reflective surface from a user, wherein the control unit detects the distance based on the distance information input to the input unit by the user.

The video apparatus may be a display apparatus comprising the speaker.

The display apparatus may be a television, the speaker may be mounted on the bottom of the television, and a tympanum of the speaker may face downwards.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they could obscure the invention with unnecessary detail.

Figure 2:
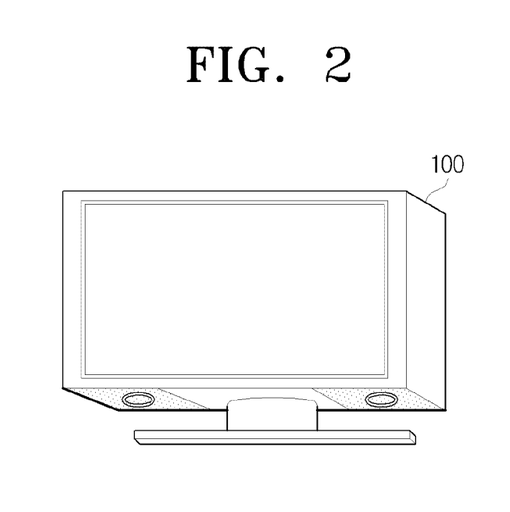
FIG. 2 illustrates a television having speakers at the bottom according to an exemplary embodiment of the present invention.

FIG. 2 illustrates an example of a television (TV) 100 according to an exemplary embodiment of the present invention. The TV 100 adopting an audio equalizing method according to an exemplary embodiment of the present invention has speakers on the bottom, and a tympanum which faces downwards.

Figure 3:
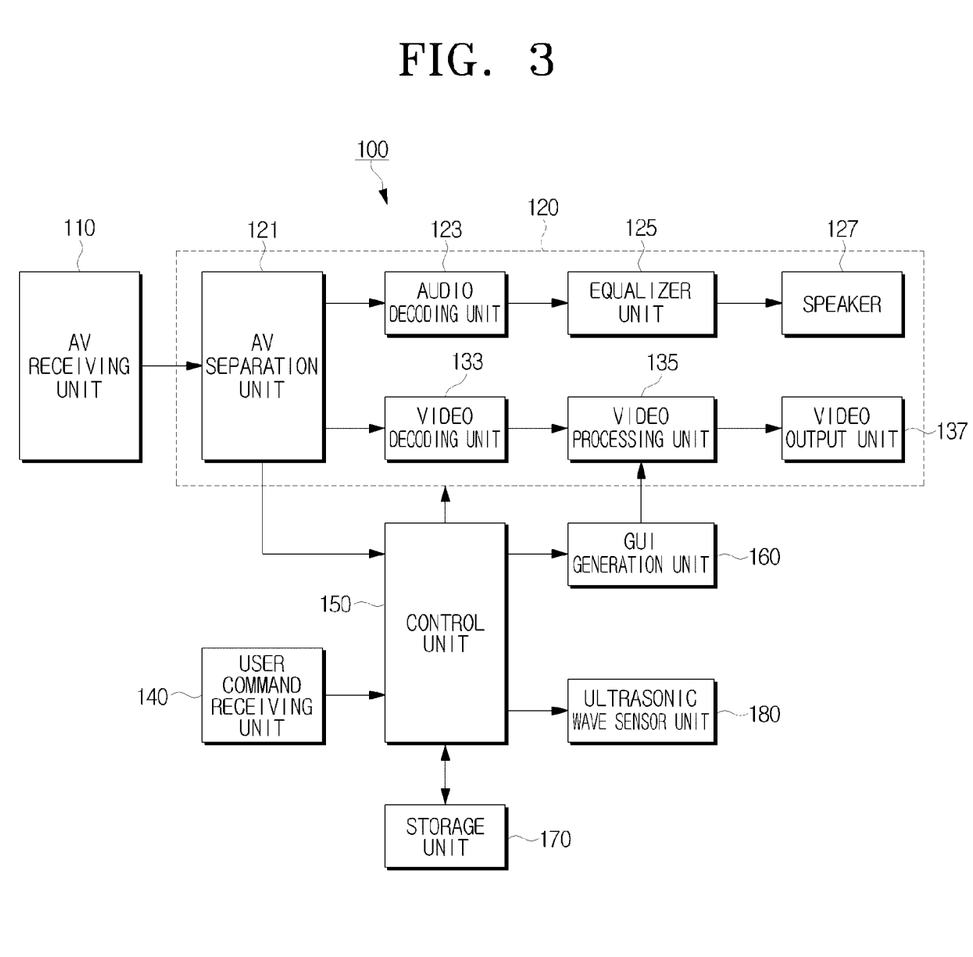
FIG. 3 is a block diagram of the television of FIG. 2.

FIG. 3 is a detailed block diagram of the TV 100 of FIG. 2.

As shown in FIG. 3, the TV 100 includes an audio video (AV) receiving unit 110, an AV processing unit 120, a user command receiving unit 140, a control unit 150, a graphical user interface (GUI) generation unit 160, a storage unit 170, and an ultrasonic wave sensor unit 180.

The AV receiving unit 110 tunes to one of broadcasts wirelessly received via air or moving images input from an external device, and demodulates the tuned one.

The AV processing unit 120 processes a broadcast signal output from the AV receiving unit 110, and includes an AV separation unit 121, an audio decoding unit 123, an equalizer unit 125, a speaker 127, a video decoding unit 133, a video processing unit 135, and a video output unit 137.

The AV separation unit 121 separates an audio signal and a video signal from the broadcast signal output from the AV receiving unit 110. The separated audio signal and video signal are transmitted to the audio decoding unit 123 and video decoding unit 133.

The audio decoding unit 123 decodes the audio signal so that the decompressed audio signal is output.

The equalizer unit 125 is a module for performing equalization. The equalization processes the audio signal to adjust the frequency characteristic of the audio signal decoded by the audio decoding unit 123, and is used to correct the recording or the features of the speaker.

The equalizer unit 125 according to the exemplary embodiment of the present invention is used for the control unit 150 to optimize the audio signal according to the distance between the speaker and the floor, as well as for the user to personally adjust the audio signal. This process will be described in detail with reference to FIGS. 8 and 9.

The video decoding unit 133 decodes the video signal output from the AV separation unit 121 so that the decompressed video signal is output.

The video processing unit 135 converts the decoded video signal into a format which can output through a display of the TV 100. To this end, the video processing unit 135 performs color signal processing and scaling of the decoded video signal.

The GUI generation unit 160 generates a GUI to be shown on the display. The generated GUI is transmitted to the video processing unit 135 and added to a video to be displayed.

The speaker 127 outputs the audio signal passing through the audio decoding unit 123 and the equalizer unit 125.

The video output unit 137 outputs the video signal output from the video processing unit 135 to the display or an external display (for example, an external TV) connected via an external output terminal.

The user command receiving unit 140 transmits user commands received from a remote control to the control unit 150, and the control unit 150 controls the overall operation of the TV 100 according to the user's commands. The storage unit 170 stores programs, data, and information for the control unit 150 controlling the operation of the TV 100.

The control unit 150 operates the AV receiving unit 110 and the AV processing unit 120 to receive and display a broadcast according to the user's commands.

The control unit 150 according to the exemplary embodiment of the present invention reads out from the storage unit 170 adjusting values corresponding to the distance between the speaker 127 and the floor based on information regarding the distance input through the user command receiving unit 140 or information regarding the distance acquired by the ultrasonic wave sensor unit 180, and subsequently operates the equalization unit 125 to optimize the audio signal output to the speaker 127. This process will be described in detail with reference to FIGS. 8 and 9.

The ultrasonic wave sensor unit 180 calculates the distance between the speaker and the floor, and transmits the calculated value to the control unit 150.

Figure 4:
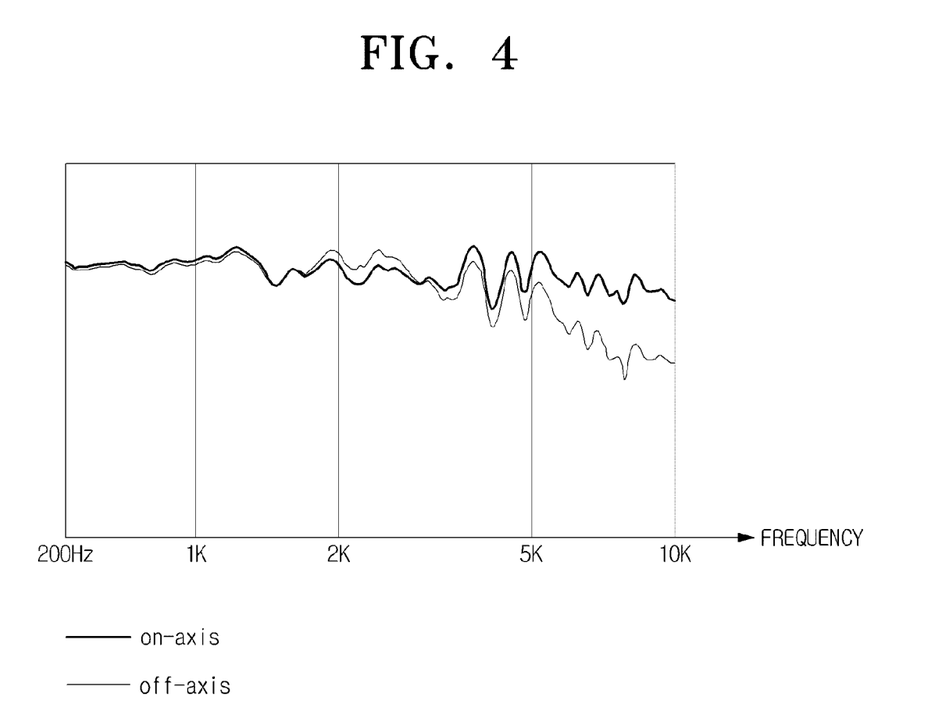
FIG. 4 illustrates audio signals when a user is in a position located on the axis of a speaker and away from the axis of the speaker.

FIG. 4 illustrates audio signals when the user is in a position located on the axis of a speaker, and away from the axis of a speaker. The related art TV in FIG. 1 has a speaker at the front, so the user views the TV from a position on the axis of the speaker. However, if the speaker is attached to the bottom of the TV as in the exemplary embodiment of the present invention, the user views the TV at a location away from the axis of the speaker 127 where audio signals are output. In this case, as shown in FIG. 4, the higher the frequency level, the lower the decibel (dB) level of the audio.

Figure 5:
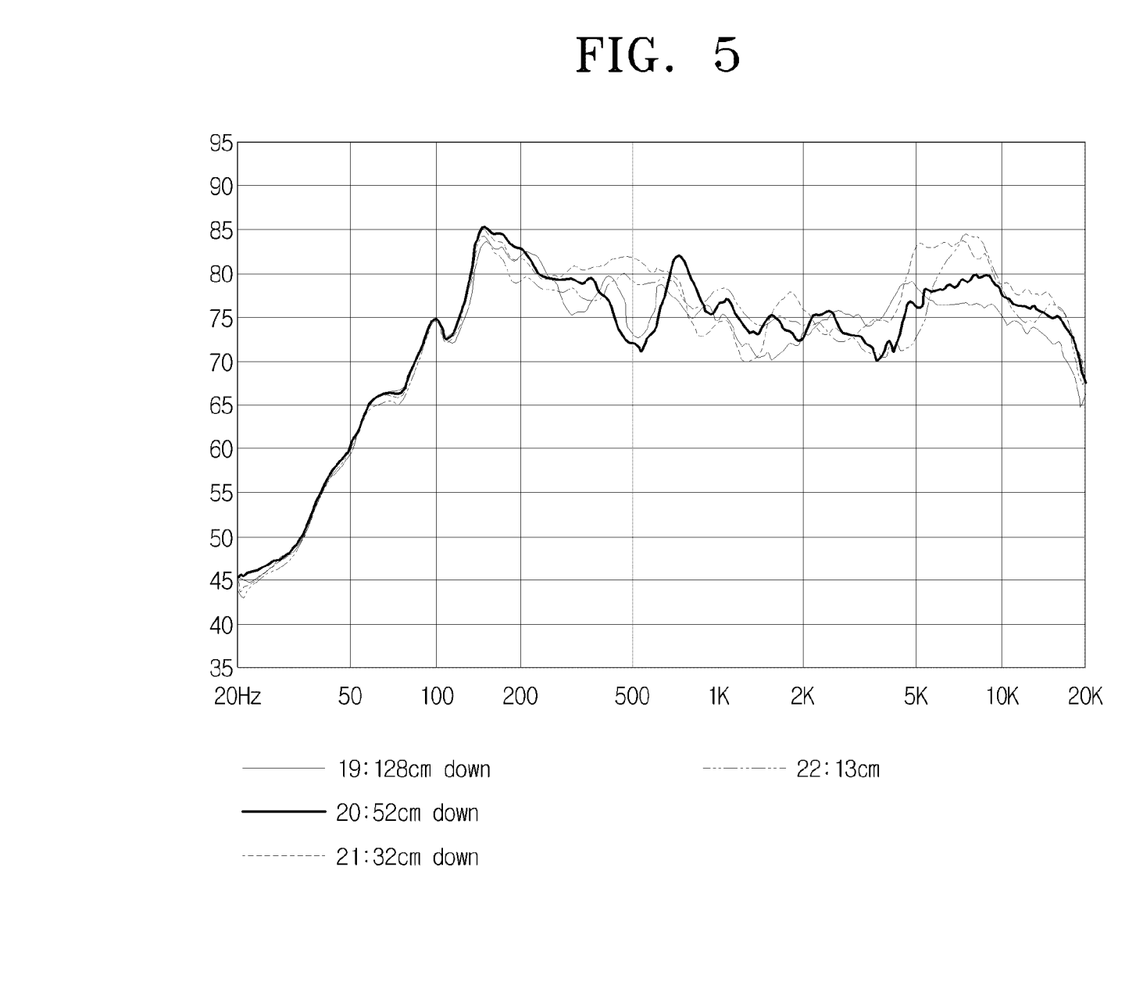
FIG. 5 illustrates the change of an audio signal according to the distance between the speaker and the floor.

FIG. 5 illustrates the change of an audio signal according to the distance between the speaker mounted on the bottom of the TV and the floor. The audio signal changes according to the distance between the TV and the floor when the user views the TV from the front of the TV.

Figure 6:
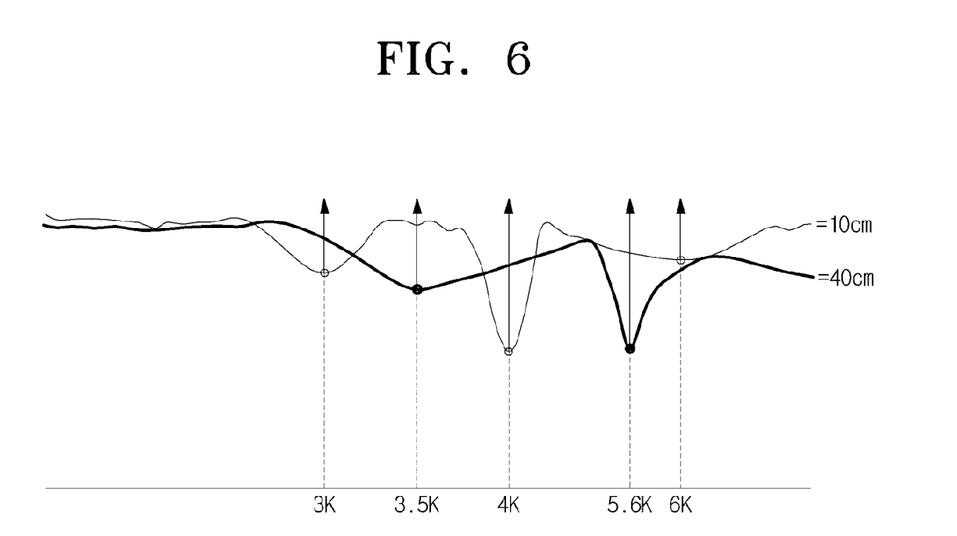
FIG. 6 illustrates the audio signal changing according to the distance between the speaker and the floor in order to describe the exemplary embodiments of the present invention.

FIG. 6 simply illustrates the graph of FIG. 5 so as to more easily describe the exemplary embodiment of the present invention. In the case of a graph indicating the distance of 10 cm between the speaker 127 and the floor, the graph falls in the frequency of 3 KHz, 4 KHz, and 6 KHz. In order to flatten the graph and optimize the audio signal, the output of the frequency of 3 KHz, 4 KHz, and 6 KHz must increase using the equalizer unit 125. An example of adjusting values needed to increase the output is shown in FIG. 7.

Figure 7:
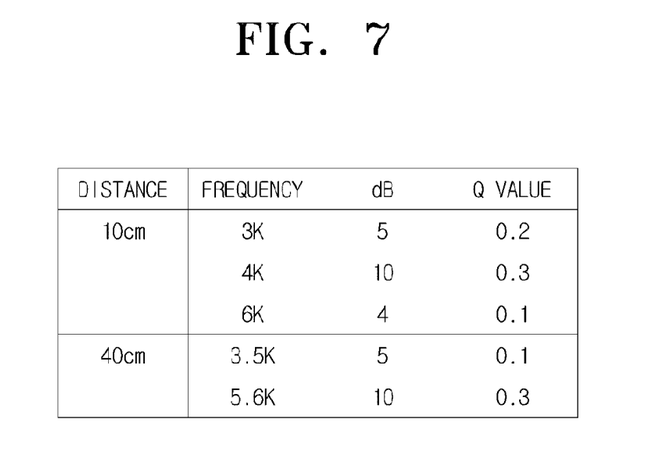
FIG. 7 illustrates variables according to the distance between the speaker and the floor to be stored based on the graph of FIG. 6.

As shown in FIG. 7, if the distance between the speaker 127 and the floor is 10 cm, the frequency of 3 KHz, 4 KHz, and 6 KHz increase the output by 5 dB, 10 dB, and 4 dB, respectively. In addition, since the slopes of the falls of the graph are different, the value Q may be used as a variable. In the case of 3 KHz, in which the fall is gentle, Q becomes 0.2. In the case of 6 KHz, in which the fall is very gentle, Q becomes 0.1.

Adjusting values to increase the falls in FIG. 6 are illustrated in FIG. 7 in the case that the distance between the speaker 127 and the floor is 40 cm, and in the case that the distance is 10 cm.

Figure 8:
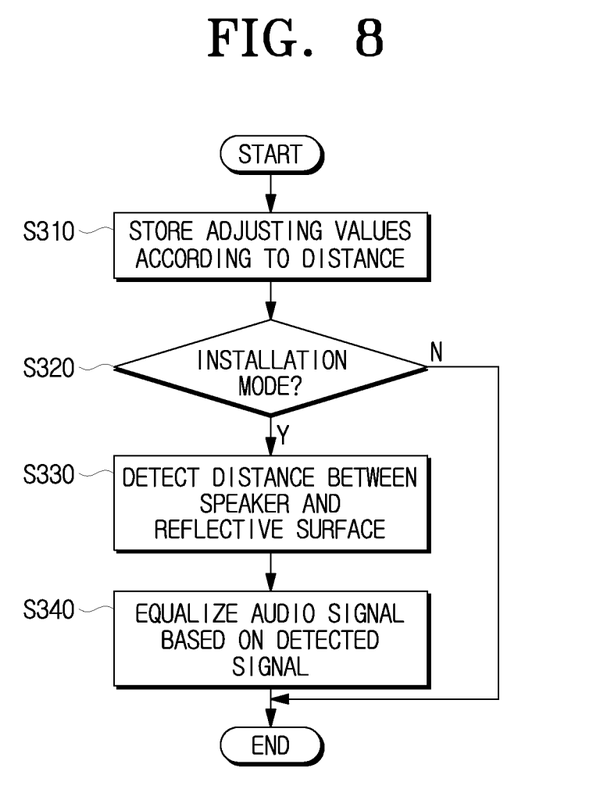
FIGS. 8 and 9 are flow charts describing an audio equalizing method according to an exemplary embodiment of the present invention.

FIG. 8 is a flow chart to describe an audio equalizing method according to an exemplary embodiment of the present invention.

In operation S310, adjusting values as shown in FIG. 7 are stored in the storage unit 170. Such adjusting values may be experimentally set by collecting the change of audio signals according to the distance between the speaker 127 and the floor.

In operation S320, whether or not the TV 100 is in an installation mode is determined. The exemplary embodiment of the present invention is mainly applied when the TV 100 is initially installed or when the location of the TV 100 changes. Accordingly, the TV 100 may receive notification from the user of installation or moving, or the TV 100 may perform equalization according to the present invention using a certain variable only when the equalization has not been previously executed.

If the TV 100 is not in an installation mode in operation S320-N, the operation according to the present invention is finished. If the TV 100 is in an installation mode in operation S320-Y, the distance between the speaker 127 and the floor is acquired in operation S330. Methods for acquiring the distance include inputting the distance from the user, and automatically calculating the distance using an ultrasonic wave sensor, which are described in detail below with reference to FIG. 9.

Figure 9:
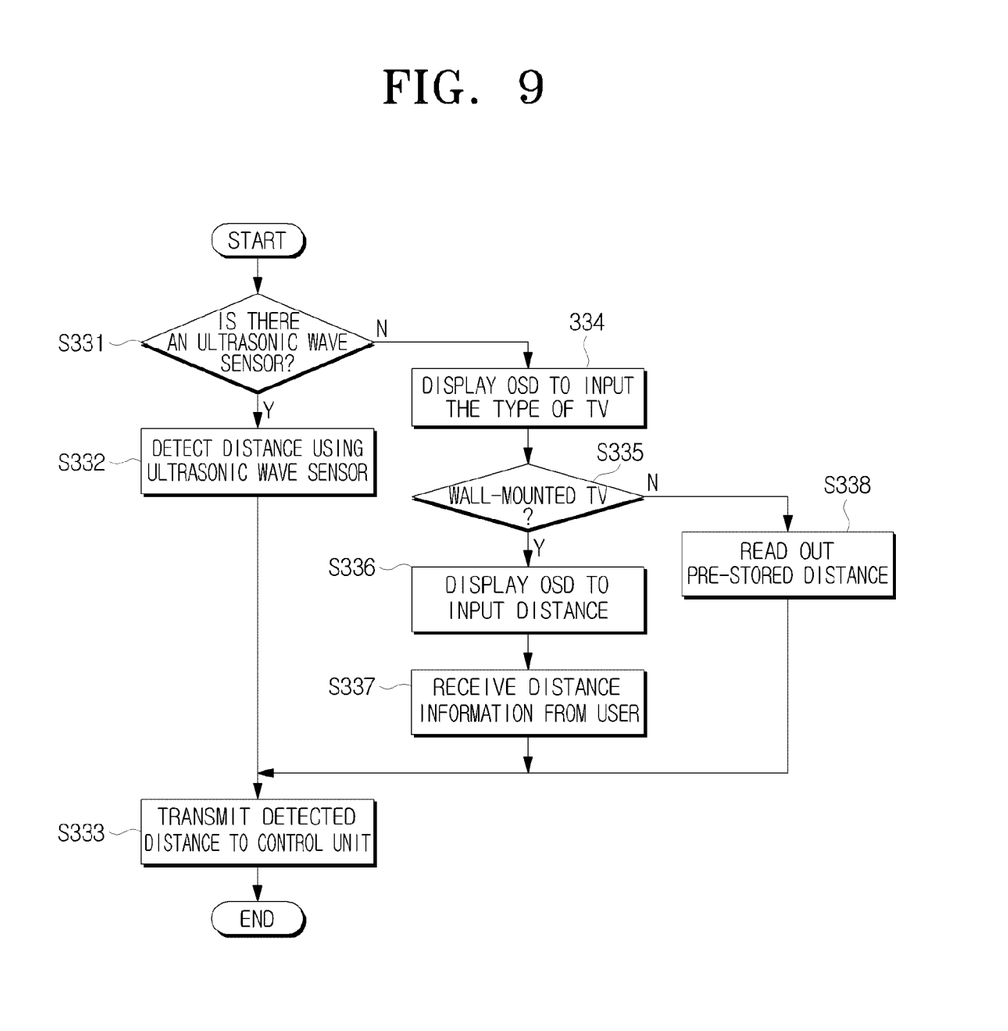

FIG. 9 is a flow chart to describe operation S330 in more detail.

In operation S331, firstly, the control unit 150 determines whether the TV 100 includes the ultrasonic wave sensor unit 180.

If the TV 100 includes the ultrasonic wave sensor unit 180 in operation S331-Y, the distance between the speaker 127 and the floor is detected using the ultrasonic wave sensor unit 180 in operation S332. The distance may be calculated by calculating the duration between transmission and return of an ultrasonic wave and compensating the velocity of sound according to the temperature of the ultrasonic wave in the air.

In operation S333, the detected distance is transmitted to the control unit 150.

If the TV 100 does not include the ultrasonic wave sensor unit 180 in operation S331-N, an on-screen display (OSD) is displayed so that the user can input whether the TV 100 is installed on the wall or is standing alone in operation S334.

If the TV 100 is not installed on the wall in operation S335-N, the distance between the speaker 127 and the floor in a standalone TV 100 is proportional to the stand of the TV 100, and TVs 100 of the same model have the same stand length. Accordingly, a pre-stored distance is read out without detecting the distance in operation S338, and is transmitted to the control unit 150 in operation S333.

If the TV 100 is installed on the wall in operation S335-Y, the distance between the speaker 127 and the floor changes according to the location at which the TV 100 is installed, and thus the distance has not been set.

Therefore, in operation S336, an OSD is displayed in order for the user to input the distance. Subsequently, in operation S337, the user command receiving unit 140 receives the distance between the speaker 127 and the floor.

In operation S333, the distance detected by the above process is transmitted to the control unit 150.

Returning to FIG. 8, in operation S340, the control unit 150 reads out the set values corresponding to the detected distance, and equalizes the audio signal based on the set values. For example, if the distance is detected to be 40 cm in operation S330, the control unit 150 reads out the set values corresponding to the distance of 40 cm from the storage unit 170, that is, (3.5 KHz, 5 dB, 0.1) and (5.6 KHz, 10 dB, 0.3) with reference to FIG. 7. Consequently, at a the frequency of 3.5 KHz, the volume increases by 5 dB and Q increases by 0.1, and at a frequency of 5.6 KHz, the volume increases by 10 dB and a Q increases by 0.3.

Figure 10:
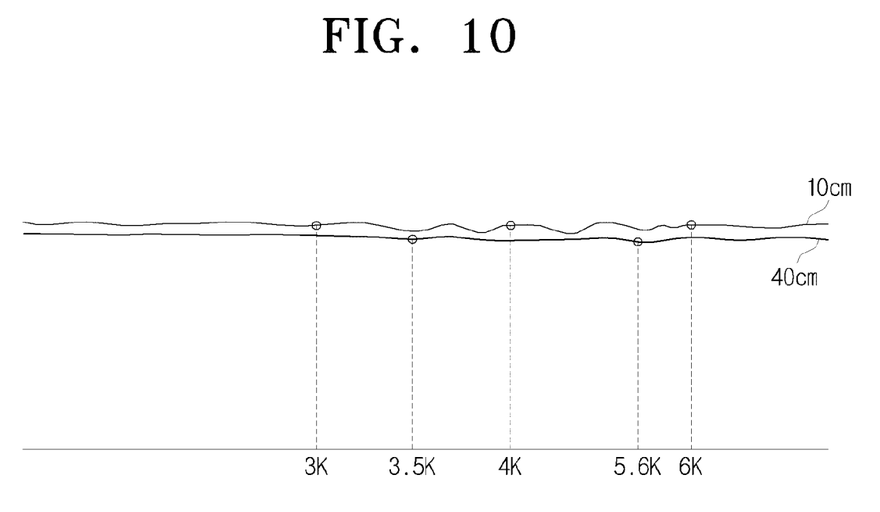
FIG. 10 illustrates the result after equalizing the audio signals of FIG. 6 according to an exemplary embodiment of the present invention.

The result of this equalization is shown in the graph of FIG. 10 which illustrates the result after equalizing the audio signals of FIG. 6. The audio signals are equalized evenly so that optimal audio signals are generated.

In the above exemplary embodiment, the TV 100 is provided as an example of a video apparatus to facilitate the explanation, so the TV 100 may be replaced with all kinds of video apparatuses having a speaker, such as a digital multimedia broadcasting (DMB) receiving apparatus, a navigation apparatus, and a personal multimedia player (PMP). Also, the TV 100 may be replaced with apparatuses for outputting only audio and not video.

In addition, in the above exemplary embodiment, the audio signals are equalized flatly as in FIG. 10, but this is merely an example to facilitate explanation. Equalization other than the form shown in FIG. 10 is also possible.

Moreover, FIGS. 6 and 7 are given as an example to describe the present invention, so more minute and detailed equalization may be applied. The distance, frequency, decibel level, and Q values which are used as adjusting values are also examples to describe the exemplary embodiments of the present invention. Variables other than these may be used as adjusting values.

Furthermore, in the present invention, audio is equalized based on the distance between the speaker and the floor, but this is merely an example. The material of the floor affects the change of audio signals, so the audio may be equalized based on the combination of the distance and the material of the floor.

As can be appreciated from the above description of a method for equalizing audio and a video apparatus using the same according to an exemplary embodiment of the present invention, a more aesthetical design can be provided by moving the position of speakers from the front of a TV to the bottom and audio attenuation generated by the speakers not facing viewers can be prevented.

The foregoing exemplary embodiments and advantages are merely exemplary and are not to be construed as limiting the present invention. The present teachings of the exemplary embodiments can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for equalizing audio, the method comprising:
   detecting a distance between a speaker and a reflective surface; and
   equalizing an audio signal to be output from the speaker based on the detected distance,
   wherein the reflective surface is a floor or a table, and
   wherein the speaker is mounted in a video apparatus, and a tympanum of the speaker faces the reflective surface,
   wherein the detection operation comprises:
   receiving information on whether the video apparatus is a stand-alone type or a wall-mounted type;

detecting pre-stored distance information if the video apparatus is the stand-alone type; and receiving information on the distance between the speaker and the reflective surface from the user if the video apparatus is the wall-mounted type.

2. The method of claim 1, wherein the equalizing the audio signal comprises, reading out an adjustment value corresponding to the detected distance from among adjustment values necessary to generate an optimal audio signal according to the distance and the audio signal is equalized using the read-out adjusting value.

3. The method of claim 1, wherein the adjustment values are a list of values comprising a frequency value and a decibel level.

4. The method of claim 1, wherein the distance between the speaker and the reflective surface is detected using an ultrasonic wave sensor.

5. The method of claim 1, wherein the distance between the speaker and the reflective surface is detected based on information input by a user.

6. The method of claim 1, wherein the video apparatus is a display apparatus comprising the speaker.

7. The method of claim 6, wherein the display apparatus is a television, the speaker is mounted on the bottom of the television, and a tympanum of the speaker faces downwards.

8. The method of claim 1, further comprising determining a material of the reflective surface, wherein the audio signal to be output from the speaker is equalized based on the material of the reflective surface and the distance between the speaker and the reflective surface.

9. An apparatus comprising:

a speaker which outputs an audio signal;

an equalizer unit which equalizes the audio signal; and a control unit which detects the distance between the speaker and a reflective surface, and operates the equalizer unit to equalize the audio signal based on the detected distance, wherein the reflective surface is a floor or a table, and wherein a tympanum of the speaker faces the reflective surface, wherein the detecting the distance comprises:

receiving information on whether the apparatus is a stand-alone type or a wall-mounted type;

detecting pre-stored distance information if the apparatus is the stand-alone type; and receiving information on the distance between the speaker and the reflective surface from the user if the apparatus is the wall-mounted type.

10. The apparatus of claim 9, further comprising a memory unit which stores adjustment values necessary to generate an optimal audio signal according to the detected distance, wherein the control unit reads out an adjustment value corresponding to the detected distance from the memory unit, and equalizes the audio signal using the read-out adjustment value.

11. The apparatus of claim 10, wherein the adjustment values are a list of values comprising a frequency value and a decibel level.

12. The apparatus of claim 9, further comprising an ultrasonic wave sensor unit which detects the distance between the speaker and the reflective surface, wherein the control unit detects the distance using the ultrasonic wave sensor unit.

13. The apparatus of claim 9, further comprising an input unit which receives information on the distance between the speaker and the reflective surface from a user, wherein the control unit detects the distance based on the distance information input to the input unit by the user.

14. The apparatus of claim 9, wherein the apparatus is a display apparatus comprising the speaker.

15. The apparatus of claim 14, wherein the display apparatus is a television, the speaker is mounted on the bottom of the television, and a tympanum of the speaker faces downwards.

16. The apparatus of claim 9, wherein the control unit operates the equalizer unit to equalize the audio signal based on the material of the reflective surface and the distance between the speaker and the reflective surface.

17. The apparatus of claim 9, wherein the apparatus is a video apparatus.

18. The method of claim 1, wherein the speaker is mounted on the bottom of a video apparatus, and the tympanum of the speaker faces downwards.

19. The apparatus of claim 9, wherein the speaker is mounted on the bottom of a video apparatus, and the tympanum of the speaker faces downwards.

20. A video apparatus comprising:

a speaker which outputs an audio signal;

an equalizer unit which equalizes the audio signal; and a control unit which determines a material of a reflective surface, and controls the equalizer unit to equalize the audio signal based on the determined material of the reflective surface and the distance between the speaker and the reflective surface, wherein the speaker is mounted in the video apparatus, and a tympanum of the speaker faces the reflective surface.

21. The apparatus of claim 20, wherein the reflective surface is a floor or a table.

22. The apparatus of claim 20, further comprising a memory unit which stores adjustment values necessary to generate an optimal audio signal according to the detected distance, wherein the control unit reads out an adjustment value corresponding to the detected distance from the memory unit, and equalizes the audio signal using the read-out adjustment value.

23. The apparatus of claim 20, further comprising an ultrasonic wave sensor unit which detects the distance between the speaker and the reflective surface, wherein the control unit detects the distance using the ultrasonic wave sensor unit.

24. The apparatus of claim 20, wherein the control unit operates the equalizer unit to equalize the audio signal based on the material of the reflective surface and the distance between the speaker and the reflective surface.

* * * * *